Figure 1:
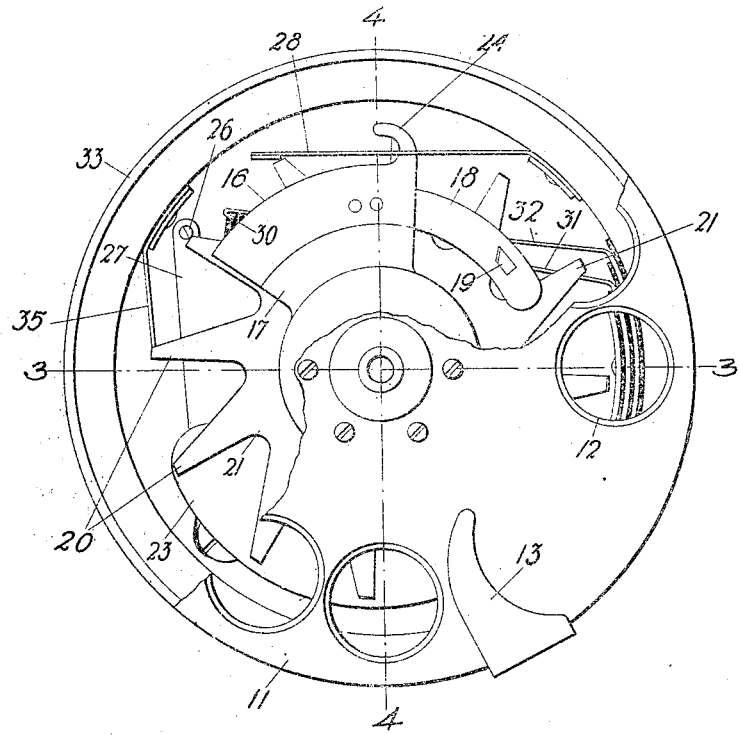

F. R. McBERTY & A. H. ADAMS.
IMPULSE SENDING MECHANISM.
APPLICATION FILED DEC. 19, 1913.

1,127,050.

Patented Feb. 2, 1915.
5 SHEETS—SHEET 1.

Witnesses.
O. M. Guthe
M. V. Conaty

Inventor:
Frank R. McBerty.
Arthur H. Adams.
by L. C. Hunnel, Att'y.

F. R. McBERTY & A. H. ADAMS.
IMPULSE SENDING MECHANISM.
APPLICATION FILED DEC. 19, 1913.

1,127,050.

Patented Feb. 2, 1915.

5 SHEETS—SHEET 2

Witnesses:
O. M. Guthe
M. V. Conaty

Inventor.
Frank R. McBerty.
Arthur H. Adams
by S. C. Tanner, Att'y.

F. R. McBERTY & A. H. ADAMS.
IMPULSE SENDING MECHANISM.
APPLICATION FILED DEC. 19, 1913.

1,127,050.

Patented Feb. 2, 1915.

5 SHEETS—SHEET 3.

Witnesses:
O. M. Guthe.
M. V. Conaty

Inventor:
Frank R. McBerty.
Arthur H. Adams
by S. C. Garner Att'y.

UNITED STATES PATENT OFFICE.

FRANK ROBERT McBERTY, OF ANTWERP, AND ARTHUR HERMAN ADAMS, OF BRUSSELS, BELGIUM, ASSIGNORS TO WESTERN ELECTRIC COMPANY, OF NEW YORK, N. Y., A CORPORATION OF ILLINOIS.

IMPULSE-SENDING MECHANISM.

1,127,050.  Specification of Letters Patent.  Patented Feb. 2, 1915.

Application filed December 19, 1913. Serial No. 807,733.

*To all whom it may concern:*

Be it known that we, FRANK ROBERT MC-BERTY and ARTHUR HERMAN ADAMS, citizens of the United States, residing at 49 Boulevard Leopold, Antwerp, Belgium, and 34 Rue de Comines, Brussels, Belgium, respectively, have invented certain new and useful Improvements in Impulse-Sending Mechanisms, of which the following is a full, clear, concise, and exact description.

This invention relates to impulse sending mechanisms and particularly to sending mechanisms of the character generally known as finger wheels used in telephone exchange systems, wherein automatic switches extend a connection to a desired line under the control of impulses initiated or sent from a subscriber's substation.

This invention has for its object to provide an improved and novel structure of impulse sending mechanism or finger wheel whereby under the manual control of a calling subscriber the necessary controlling impulses may be produced or sent in an accurate and efficient manner.

One of the features of the invention has to do with an impulse mechanism wherein the duration of the controlling impulses, having once been determined, will be wholly independent of the rate of movement of the driving portions of the mechanism and independent of any external interference with the normal operation of such mechanism.

Another feature of the invention has to do with the construction and arrangement of parts in such a manner that the impulses produced by the mechanism may be extremely short, while at the same time providing means whereby such impulses may be accurately timed, and the number and character thereof for a given operation of the mechanism be positive and unchangeable.

A further object of the invention relates to the provision of means whereby the last impulse of a series of impulses produced by any operation of the mechanism will relatively be prolonged for a period greater than the prior impulse or impulses produced by the same operation thereof, although similar thereto in general characteristics.

Another feature of the invention relates to such general construction and arrangement of parts by which a simple and efficient impulse mechanism comprised of but few and relatively simple parts may be produced without detracting from the efficiency and accuracy thereof, nor in any way adding complexities to the operation of such mechanism by the subscriber.

Other features of the invention will sufficiently appear from the detailed description herein, as embodied in the construction set forth in the accompanying drawings of which—

Figure 3:
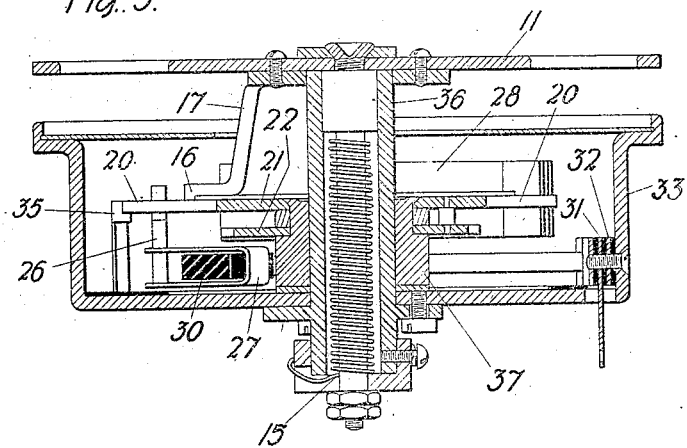
Figure 2:
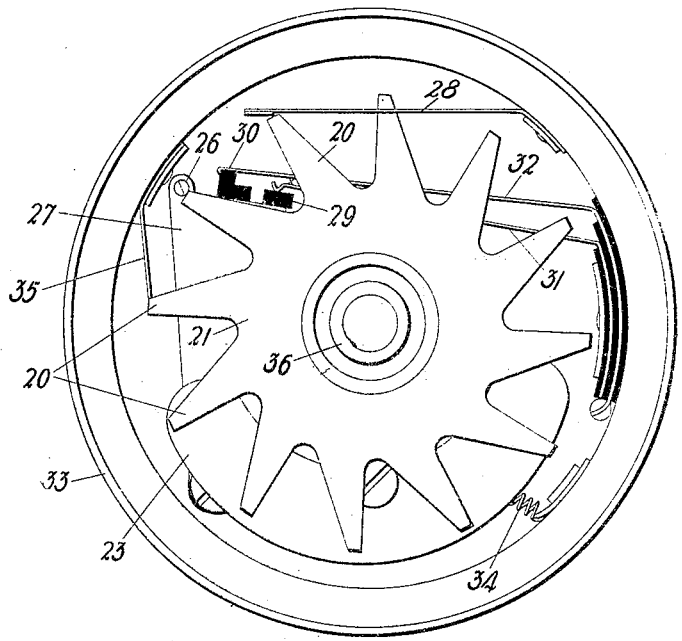
Figure 5:
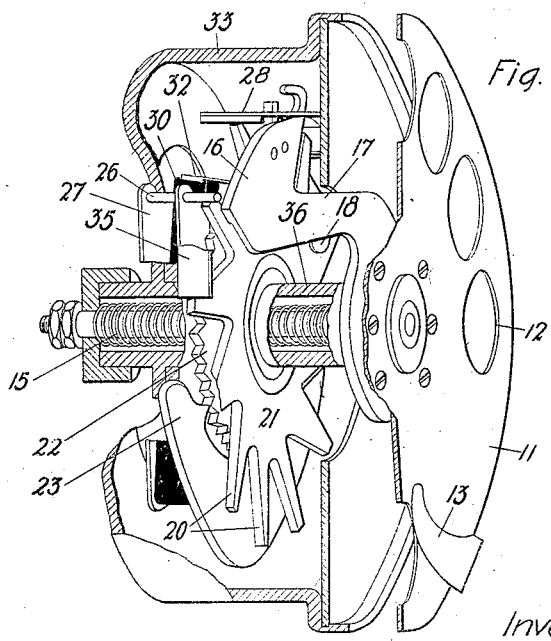
Figure 4:
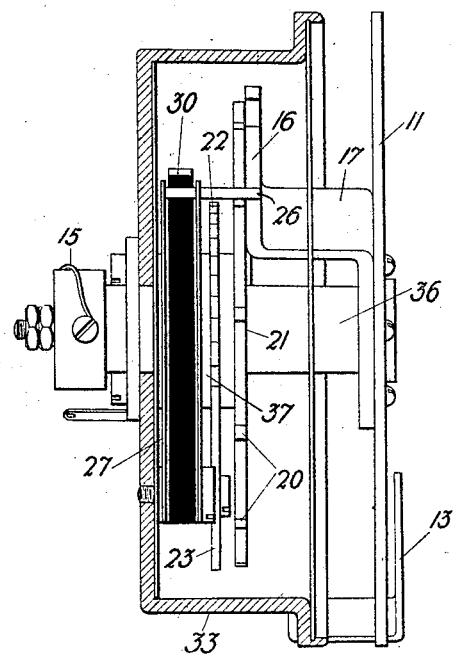
Figure 6:
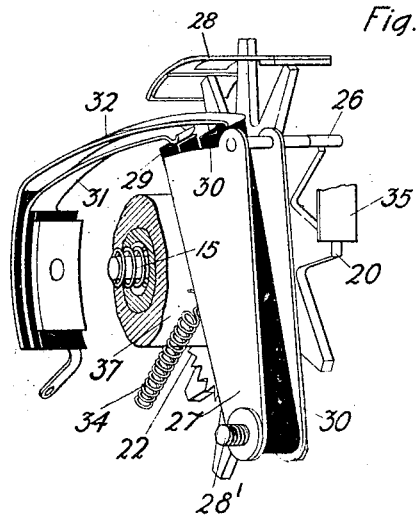

Figure 1 is a front view of an impulse producing mechanism or finger wheel embodying the invention with a part of the manually controllable finger disk and also a portion of the inclosing case broken away to show more clearly the essential elements of the device. Fig. 2 is a front view of the device with a number of the parts removed to show clearly the relation of the star wheel and the interrupter controlled by it, together with the circuit connections of the device. Fig. 3 is a horizontal section of the device as shown in Fig. 1 upon the line 3—3. Fig. 4 is a vertical section of the device as shown in Fig. 1 upon the line 4—4. Fig. 5 is a perspective view of the device with portions of the finger disk and the inclosing case removed. Fig. 6 is a detail of the interrupter and the star wheel controlling the same. Figs. 7, 8, 9, and 10 are detail views showing the position of the carrier and contact spring, at different steps in the operation of the device.

A casing 33 carries at its center a hollow shaft 36. At the front of this shaft is mounted a finger-disk 11 having a plurality of holes therein, as shown. This finger-disk 11 may be moved about its center in a clockwise direction and when released, will return to its normal position under the influence of a spring 15. Within the casing, and mounted on the shaft 36 is a hub 37 having mounted thereon a star wheel 21 and a ratchet wheel 22 which coöperates with the dog 23 pivoted to the casing.

Pivotally mounted to the bottom of the casing 33 is a carrier 27 carrying members 29 and 30, which coöperate with contact springs 31 and 32 to make and break a circuit, as will be hereinafter described.

Fastened to the inner side of the finger-disk 11 is a member 17 which carries at its inner end a cam plate 16; to the cam plate 16 is fastened a spring member 18 which has a depression 19 therein adapted to engage with the teeth 20 of the star wheel 21. As the finger-disk is moved in a clockwise direction, the depression 19 slips over the teeth 20, and when the finger wheel is released to return to its normal position the depression 19 contacts with a tooth 20, moving the star wheel 21 in a counter-clockwise direction, as will be hereinafter described. Fastened to the casing is a spring stop member 28 with which a hook 24 on the cam member 16 contacts to limit the counter clockwise movement of the star wheel. The star wheel 21 always moves in a counter clockwise direction and is held against a return movement by means of a stop 35 which places itself behind each tooth 20 of the star wheel as it moves past such stop.

In devices of this character the subscriber moves the disk 11 in a clockwise direction until the opening therein, 12 for example, corresponding to the first digit of the number desired has been brought adjacent to the stop 13 and then releases such disk to allow it to return to its normal position. This operation is accomplished by simply inserting the finger into the proper hole and rotating the disk in a clockwise direction until the finger strikes upon the stop 13 when, by removing the finger from the hole, the disk will be restored to normal in a counter-clockwise direction by power supplied by the spiral spring 15. The movement of the finger disk in the clockwise direction is an idle movement, no electrical changes being produced and no mechanical changes other than the winding up of the spring 15. With this movement of the disk, however, the plate 16, carried by an arm 17, fastened to the disk 11, has been moved with said disk and a spring 18 carried by said plate and provided with a tooth 19 has passed by a number of teeth 20 on the star wheel 21 corresponding to the digit indicated by the subscriber. Immediately upon the release of the finger disk by the subscriber such disk will start in its restoring movement and the tooth 19 engaging with a tooth 20 upon the star wheel 21, causes such star wheel to be moved in a counter-clockwise direction along with the finger disk.

The star wheel has associated therewith a simple escapement mechanism comprising the toothed wheel 22 and the vibrating dog 23. This dog 23 has considerable inertia, and the movement of the star wheel with the finger disk in the reverse movement of such disk is, to a certain extent, impeded in the well-known manner. The reverse or counter-clockwise movement of the finger disk, and, therewith, of the star wheel, will continue until, as the finger disk comes into its normal position, the hook 24 on the plate 16 engages the spring 28. This engagement brings the finger disk to rest and the entire device is again in normal condition ready for a subsequent operation.

In the normal condition of the device, regardless of the particular position in which the star wheel may be at such time, the stud 26 will be resting upon the top of one of the teeth of the star wheel. This stud 26 is carried by a pivoted segmental carrier 27 mounted on the screw 28' and carrying fastened thereto a piece of insulation 29. The carrier 27 is held in its normal position with the stud 26 in contact with a tooth 20 of the star wheel by the spring 34. Contained within the segmental portion 27 and also pivoted upon the screw 28' is an arm of insulation 30, which is adapted to move within the limits set by the portion of insulation 29 and a continuation of the stud 26. Coöperating with the portion of insulation 29 and the arm of insulation 30 are the contact springs 31, 32 mounted upon and insulated from the casing 33 of the device. These contact springs 31, 32, form the terminals of the circuit in which the impulses (circuit interruptions) are to be produced by the operation of the device by the subscriber.

Figure 7:
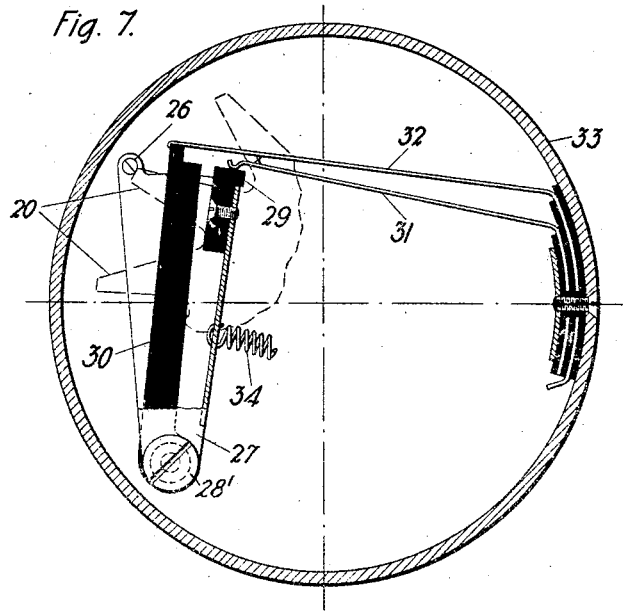
Figure 9:
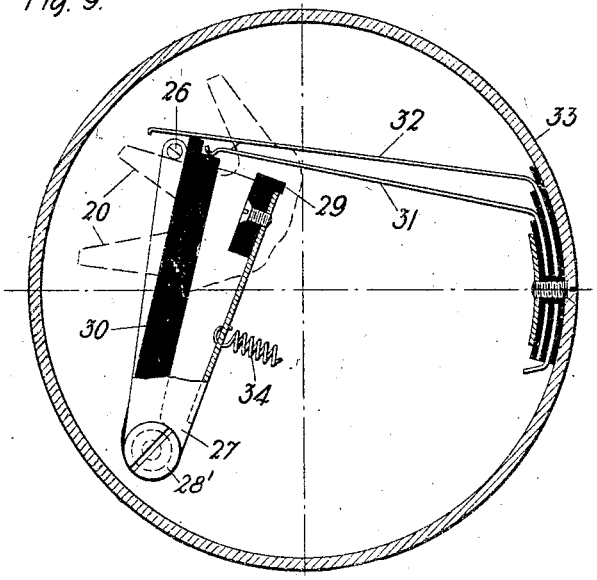
Figure 8:
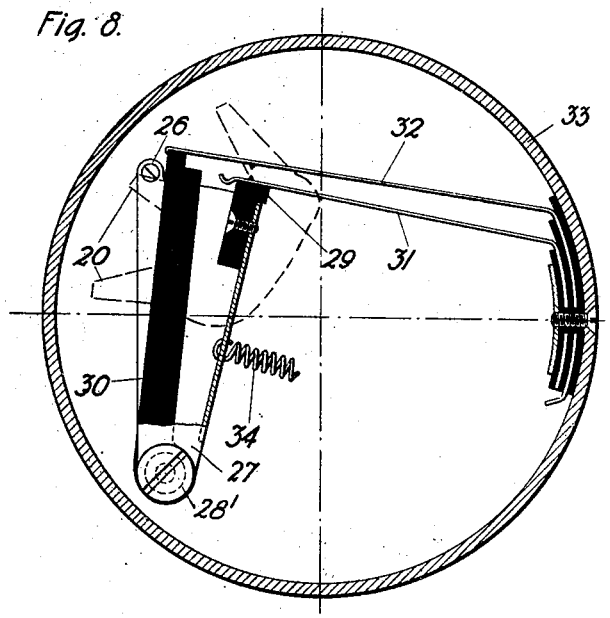
Figure 10:
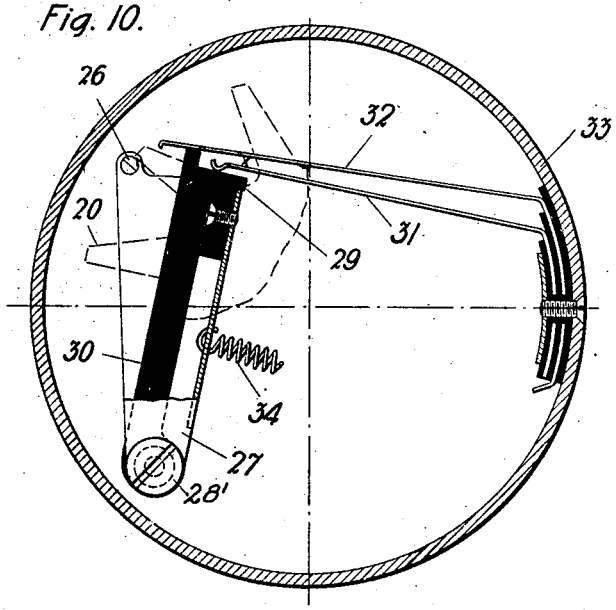

In the movement of the star wheel, as the tooth 20 on which the stud 26 rests moves from under such stud the carrier 27 is moved about its pivot to the right as shown in Fig. 1 under the influence of the spring 34. In this movement of the carrier the circuit between the springs 31, 32, which is normally closed, will be immediately opened, but will be again closed when the stud reaches its extreme position under the influence of the spring 34. As the next succeeding tooth 20 of the star wheel comes in contact with the stud 26, the stud and the carrier 27 will be moved against the influence of the spring 34 until it again rests upon the top of a tooth 20. In this return movement of the stud and carrier the circuit between the springs 31, 32, will not be opened. Referring specifically to Figs. 7, 8, 9 and 10, this operation of the interrupter device may be clearly understood. When the stud 26 rests upon the top of the tooth 20 of the star wheel the interrupter device and the contact springs coöperating therewith will be as shown in Fig. 7. As the tooth 20 moves from under the stud 26 the parts of the interrupter device will be moved under the influence of the spring 34 and will, in such movement, cause the interruption of the circuit between the springs 31, 32, as illustrated in Fig. 8. The further movement of the interrupter device under the influence of the spring 34 will cause the re-closure of the circuit between the springs 31, 32, as shown in Fig. 9. As the stud 26 and its carrier are returned to their normal position by the next subsequent tooth 20 of the star wheel, the parts will be returned to positions as shown in Fig. 7, but no interruption of the circuit between the springs 31, 32, will take place for the reason that the arm of insulation 30 supporting the spring 32 will maintain the circuit closed until when the portion of insulation 29 presses thereagainst it is moved from under such spring 32, at which time, however, the portion 29 will support the spring 32, thereby preventing any opening of the circuit. This action of the parts whereby the circuit is maintained, as the stud 26 rises upon a subsequent tooth 20 of the star wheel, is clearly illustrated in Fig. 10. It will therefore be seen that, due to the movement of the star wheel, the distance of one tooth has caused a single interruption of the circuit, such interruption being exceedingly short but capable of being accurately timed by the adjustment of the tension of the spring 34. The interruption of the circuit takes place only when the stud 26 is dropping from the position in which it is supported by a tooth 20 to the lowest position of which it is capable of taking under the influence of the spring 34. When the stud is in either of its extreme positions, or when it is being restored from its lowest position to its position resting upon a tooth 20 of the star wheel, the circuit of the springs 31, 32, is at all times closed.

As the finger disk 11 is about to come into its normal position, that is, after all but one of the impulses have been produced, and as the stud 26 drops for the last time in this operation from the tooth 20 it is prevented from moving to the full extent of its usual movement by the plate 16, being stopped by such plate in such position that the parts of the interrupter device and the springs 31, 32, remain in the positions indicated in Fig. 8 until, as the star wheel is again brought to rest, it rides up upon the subsequent tooth 20. This last current impulse therefore is measured by the time it takes the star wheel to move an angular distance between two of the teeth 20. This impulse, although it may be relatively short, is materially longer than the impulses produced in the manner hereinbefore described. The operation of the finger disk, therefore, has for any given digit desired to be sent by such operation produced a definite number of impulses corresponding to such digit, all of such impulses except the last one being short and of a certain definite duration, whereas, the last impulse is a materially longer impulse.

A convenient way to adjust the tension of the spring 34, in order to get the produced impulses of proper duration by the normal operation of the interrupter device is to have such spring extend beyond the casing 33, place weights upon such spring until the proper tension is obtained, when the spring may be fastened by the means shown, and the portion extending beyond the casing cut off.

We claim:—

1. In an impulse sender for automatic telephone exchanges, the combination with an electrical contact, of a spring-pressed actuating arm therefor, a manually operated member adapted to actuate said arm, said member determining the number of actuations and the intervals between actuations, and said spring-pressed arm the duration of such actuations.

2. In an impulse sender for automatic telephone exchanges, the combination with an electrical contact, of a toothed wheel, a finger disk adapted to be variably operated to set the same, a spring-pressed actuator for said contact adapted to be operated by said wheel once for each movement thereof the pitch of one tooth and constructed and arranged so that the duration of the movement during which said actuator actuates said contact, is independent of the displacement of said teeth and of the rate of rotation of the wheel.

3. In an impulse sender, the combination with a toothed wheel, of an electrical contact, an actuator comprising a pivoted spring-pressed member riding upon the periphery of said wheel and carrying two insulated parts one fixed to said member and the other pivoted to move independently therewith, whereby each tooth of the wheel first permits the first of said parts to move to open the contact and a definite interval thereafter causes the second to close the same.

4. In an impulse sender, the combination with an electrical contact, of a toothed wheel, and means operated by said wheel for causing said contact to be actuated a number of times all of the same duration except the last which is longer than the remainder.

5. In an impulse sender, the combination with a toothed wheel, of an electrical contact, an actuator comprising a pivoted spring-pressed member riding upon the periphery of said wheel and carrying two insulated parts one fixed to said member and the other pivoted to move independently therewith, whereby each tooth of the wheel first permits the first of said parts to move to open the contact and a definite interval thereafter causes the second to close the same, means being provided on said wheel for prolonging the interval between the last opening and closing of the contact.

6. In an impulse sender, the combination with a toothed wheel, of an electrical contact, an actuator comprising a pivoted spring-pressed member riding upon the periphery of said wheel and carrying two insulated parts one fixed to said member and the other pivoted to move independently therewith, whereby each tooth of the wheel first permits the first of said parts to move to open the contact and a definite interval thereafter causes the second to close the same, and blocking means inserted between two of the teeth adapted to hold the actuator in such an intermediate position while the wheel is moving between said two teeth that said contact is maintained open while such actuator is riding upon said blocking means.

In witness whereof, we hereunto subscribe our names this 18th day of November A. D. 1913.

FRANK ROBERT McBERTY.
ARTHUR HERMAN ADAMS.

Witnesses:
F. T. WOODWARD,
G. DE LERG.